Patented Nov. 30, 1943

2,335,242

UNITED STATES PATENT OFFICE 2,335,242

FORMED ARTICLE AND METHOD OF MANUFACTURE

Harold W. Greider and Roger A. MacArthur, Wyoming, Ohio, assignors to The Phillip Carey Manufacturing Company, a corporation of Ohio No Drawing. Application July 11, 1939, Serial No. 283,738

6 Claims. (Cl. 92—21)

This invention relates to formed articles and magnesium carbonate therefor and the manufacture thereof. This invention relates especially to the production of normal magnesium carbonate for use in making such articles and to materials comprising normal magnesium carbonate and to formed articles comprising basic magnesium carbonate derived from normal magnesium carbonate.

One of the most extensively produced heat insulation materials used at the present time is an insulation which is known as "85% magnesia." This insulation is made by rapidly heating a 2 or 3% solution of magnesium bicarbonate to a temperature above about 200° F. to precipitate basic magnesium carbonate. The basic magnesium carbonate, freed from excess water, is made into a slurry containing about 15% of asbestos fiber and about 85% of the basic magnesium carbonate. The slurry is usually molded in filter molds at a pressure of about 15 to 40 pounds per square inch. After molding the shapes are dried and trimmed to proper dimensions. Due to the inherent physical properties of the basic magnesium carbonate the insulation is light and bulky for its weight and has good insulating properties. The insulation usually is used at temperatures below about 550° F.

It has heretofore been proposed to make the 85% magnesia insulation by preparing a slurry which instead of containing basic magnesium carbonate, contains crystals of normal magnesium carbonate together with the asbestos fiber. In such case the slurry is molded in a mold which may be a filter mold or may be an ordinary mold if the slurry is not excessively dilute. Upon heating the molded shape above about 160° F. and preferably above about 180° F. while the molded shape is moist, the normal magnesium carbonate is converted into basic magnesium carbonate. The normal magnesium carbonate in decomposing in the mold to form basic magnesium carbonate has the property of bonding the mass together to such extent that less molding pressures are required in making a molded article of desired strength than when preformed basic magnesium carbonate is molded in a filter mold. In fact it is possible to make insulations having sufficient strength for many purposes even when no pressure whatever is used. Moreover, in drying the molded shapes little or no shrinkage occurs, thus preserving the formed article in a light, distended state and permitting the molding of articles of substantially the ultimate dimensions desired without allowances for shrinkage and warping and subsequent trimming off of excessive amounts of material to bring the article to desired shape and dimensions.

In addition to the above, other articles may be made by forming an article comprising normal magnesium carbonate and then heating the formed article to convert the normal magnesium carbonate to basic magnesium carbonate. Thus an improved high temperature heat insulation material may be made as described in Patent No. 2,262,953 which resulted from our application Serial No. 283,066 filed July 6, 1939, for Manufacture of heat insulation material and composition therefor and resulting product and an improved structural article may be made as described in our application Serial No. 283,972 filed July 12, 1939, for Preformed structural material and the manufacture thereof, said applications having been executed on even date with this application.

It is a purpose of this invention to improve articles such as those referred to hereinabove so as to improve the strength of such articles relative to their density and, from another point of view, to enable articles of decreased density to be produced having a predetermined desired strength.

It is a feature of this invention that the improvements referred to are attained by modification of the physical state of the normal magnesium carbonate that is incorporated in formed articles and is converted to basic magnesium carbonate by heating in the presence of moisture.

There are several methods known in the art for producing normal magnesium carbonate. This material may be produced by heating magnesium bicarbonate solutions under proper conditions, as disclosed in our copending application Serial No. 225,140 filed August 16, 1938. It may also be formed by reaction between carbon dioxide gas and magnesium oxide as is fairly well known in the art; and likewise by the reaction of a soluble magnesium salt in solution with an alkali-metal bicarbonate salt, and by other known methods.

If normal magnesium carbonate is formed from a magnesium bicarbonate solution at normal temperature relatively enormous crystals are developed. As described in our said application Serial No. 225,140, relatively fine crystals of normal magnesium carbonate can be formed by controlled heating of magnesium bicarbonate solution. If magnesium chloride is reacted with sodium carbonate, relatively fine crystals of normal magnesium carbonate can be formed especially when the concentrations are high and an elevated temperature is employed. When calcined magnesite or magnesium hydroxide in water suspension is gassed with carbon dioxide, rapid introduction of carbon-dioxide, use of elevated temperatures, and vigorous agitation tend to promote the production of small crystals.

Regardless of the method of production, such as those mentioned above, and regardless of the size of the crystals formed, normal magnesium carbonate is formed as needle-shaped crystals. Furthermore, the crystals, being soluble in water, tend to increase in size, if stored, probably due to Ostwald ripening effect, and since in plant production of formed articles storage of formed normal magnesium carbonate crystals frequently becomes necessary, crystal growth is troublesome and may so adversely affect the material as to make it wholly unusable.

We have found that by modifying the physical state of normal magnesium carbonate as produced by the methods heretofore used and exemplified by the methods referred to hereinabove, one can improve the strength of formed articles which are made by forming the articles from an aqueous mass comprising normal magnesium carbonate and then converting the normal magnesium carbonate to basic magnesium carbonate by heating. In this way articles of greater strength for a given density or of decreased density for a certain strength can be produced. Moreover, according to this invention the various controls which have been resorted to heretofore at considerable trouble and added expense to obtain small crystals of normal magnesium carbonate are largely obviated and the deleterious effects of storing normal magnesium carbonate after its production are avoided.

According to our invention, the naturally-occurring relatively large needle-shaped crystals of normal magnesium carbonate are disintegrated so that a multiplicity of the normal magnesium carbonate crystals instead of occurring in needle-shaped form are caused to occur in the form of unordered particles of miscellaneous and irregular shape. We have found that by breaking down the needle-like crystals of the normal magnesium carbonate a product is produced which, when the normal carbonate is converted to basic magnesium carbonate in a formed article by heating, has better bonding property than that which can be attained when the needle-like crystals of normal magnesium carbonate that naturally occur are used in making formed articles.

The change in the physical state that affords the improved results above-mentioned is produced by mechanical disintegration of the naturally-occurring needle crystals of the normal magnesium carbonate. We have found that crystals of normal carbonate of magnesium are sufficiently fragile that they may readily be mechanically subdivided and reduced in size economically, and that said mechanically worked normal carbonate may be easily controlled in physical characteristics so as to produce materials such as 85% magnesia of uniform properties. We have found particularly that passage of said normal carbonate through a continuous rod or tube mill produces economically an especially desirable material. The action of such a mill is so efficient that a small inexpensive machine will handle substantial tonnage of said normal carbonate. The temperature of said working should be kept below about 158° F., as above this temperature basic carbonate of magnesium is formed. We prefer to mill the material at temperatures well below 158° F. A continuous ball mill, or roll mill has likewise been found efficacious, and subject to easy control. Other mechanical devices such as impeller pumps or colloid mills, etc. will be found suitable if the clearance is sufficiently small. If desired, quick tests of the proper rate of feed through any of these machines may be made by microscopic examination of the crystals or by the rate of subsidence of the solids in water.

In the practice of this invention, we have passed a suspension of coarse crystalline normal carbonate of magnesium through a small rod mill, the length of time said suspension being in the rod mill being ten minutes. The suspension was about 25 per cent. by weight normal carbonate of magnesia and the needle-like crystals tended to cause "brush heap" packing, making the suspension a paste that would scarcely flow under the influence of gravity. After passage through the rod mill, the suspension was a fluid resembling thin cream.

The water content of the suspension prior to passage through the mill depends upon the use to which the material is to be put. If the product containing the milled normal carbonate is to be filter molded, wherein water is lost, water may be added to the paste prior to passage through the mill. If the product is to be cast, less water may be present. It is to be noted that whereas the unmilled normal carbonate may settle in water so that a given concentration of solids has a water layer above it, after subsidence, of 25% of the height of the column, after the milling the subsidence may be substantially zero.

Disintegration by a mechanical machine that grinds or crushes the normal magnesium carbonate crystals has a selective action on the larger crystals and produces a product wherein the particles have a size range that permits the particles when set by subsequent heating to bond together with improved bonding strength, said bonding strength being particularly valuable when said normal magnesium carbonate is used with inert fillers, that is, with fillers such as diatomaceous earth that have substantially no bonding power.

A further advantage to be gained by such disintegration is that mixtures containing said disintegrated normal magnesium carbonate harden in the mold much more quickly than mixtures containing the untreated crystals.

In order to illustrate the practice of this invention and the improvements that are afforded thereby, it will be illustrated in connection with certain examples. Normal magnesium carbonate was made by heating a solution of magnesium bicarbonate solution of about 2 to 3% concentration at a temperature between about 140 to 158° F. at atmospheric pressure as described in our application Serial No. 225,140. The particle dimensions of the needle crystals of normal magnesium carbonate thus produced varied from about one to six microns in thickness and from about ten to eighty microns in length. The normal magnesium carbonate thus produced is representative of the product produced by other known methods of producing normal magnesium carbonate when control is exercised to produce fine crystals.

The crystals produced as above-mentioned and while in an aqueous slurry of about 25% concentration, were passed through a small rod mill with an operating cycle of about 15 minutes. The resulting product was a mass of crystals for the most part of unordered and haphazard shape ranging from less than 1 to about 6 microns in thickness and from less than 1 to about 20 microns in length, with the average length of particle less than 10 microns. Moreover, the specific surface of the crystals was greatly increased by the treatment. This is especially valuable in that the specific surface of a binder largely determines its binding strength.

The disintegrated crystals of normal magnesium carbonate were then made into an aqueous slurry containing as solids about 11% asbestos fiber and about 89% of normal magnesium carbonate and containing about 3.5 parts of water to each part of solids. The slurry was molded without pressure and the mold was heated to 190° F. for about 1.5 hours to substantially convert the normal carbonate into basic carbonate. The mold was then removed from the formed article and the article dried. The article thus produced was compared with an 85% magnesia article similarly prepared but omitting the disintegration of the normal magnesium carbonate crystals. The article produced from the disintegrated crystals was found to be about 25% stronger for a given density than the article produced from the crystals that had not been disintegrated. Likewise by increasing the amount of water used in the molded slurry containing the disintegrated crystals of normal carbonate, it was possible to decrease the density of molded material beyond what was possible using the crystals that had not been disintegrated. While maintaining the same degree of strength, it was found possible to decrease the density so as to be about 25% less than when the non-disintegrated crystals were used. Since the selling price of such installations is based on unit volume rather than weight, it is apparent that this saving in material while maintaining a desired standard of strength is of great practical significance and value.

The disintegration of the naturally-occurring needle-shaped crystals of normal magnesium carbonate is likewise of great advantage in the forming of articles on a paper-making machine. In our said application Serial No. 283,972 filed July 12, 1939 for Preformed structural material and the manufacture thereof, we describe the formation of a fibrous sheet containing normal magnesium carbonate from a wet furnish on a conventional paper-making machine. The article after formation is subjected to pressure and is heated while moist to convert the normal magnesium carbonate to basic magnesium carbonate, thereby producing a tough and strong structural material. We have found that great difficulty is encountered in properly forming a water-laid fibrous sheet on a paper-making machine either of the Fourdrinier type or of the cylinder type when the needle-shaped crystals are incorporated in the furnish due chiefly to the fact that slurries or pastes of said crystalline material are not sufficiently gelatinous to form properly and adhere to the accumulator roll. When, however, the needle crystals of normal carbonate are disintegrated according to this invention, a water-laid sheet can readily be made in a satisfactory manner on a paper-making machine. Wet grinding or other disintegration of the normal magnesium carbonate is distinctly preferable when the disintegrated product is to be used in a paper-making operation. The disintegration of the crystals of normal magnesium carbonate is likewise advantageous in the making of the molded and compressed structural materials also described in the application referred to.

In the practice of this invention, it is preferable to subject the needle crystals of normal magnesium carbonate to wet grinding, although it is not beyond the scope of this invention to dry the crystals and then subject them to disintegration. Wet grinding has a better selective action in disintegrating the larger crystals than does dry grinding and permits production of formed articles having greater strength after heating. If it is desired to store the particles after disintegration, it is preferable to treat the crystals formed from a magnesium bicarbonate solution prior to disintegration thereof so as to remove any magnesium bicarbonate that may remain adherent thereto as by washing the crystals with water or by neutralizing the bicarbonate with some alkaline material such as magnesium oxide or sodium hydroxide. Preferably, disintegration of the normal magnesium carbonate is followed as promptly as conveniently possible by use of the disintegrated product in the manufacture of formed articles, but we have found that removal of substantially all of the magnesium bicarbonate associated with the normal carbonate crystals when said crystals are made by heat treatment of magnesium bicarbonate solutions, allows said crystals to be stored without substantial harm for protracted periods.

While this invention has been described in connection with certain types of formed articles, it is apparent that it can be practised in connection with other articles which are produced by forming to desired shape a mass comprising normal magnesium carbonate and then heating the mass while moist to convert the normal magnesium carbonate to basic magnesium carbonate. In this connection, this invention may be practiced to advantage in connection with the manufacture of heat insulation as described in our application Serial No. 283,066, filed July 6, 1939, for Manufacture of heat insulation material and composition therefor and resulting product (Patent No. 2,262,953), by disintegrating the normal magnesium carbonate in the presence of calcium carbonate prior to forming and heating the molded insulation.

Filler materials as desired may, of course, be used with the normal magnesium carbonate. Asbestos fiber has been mentioned as a fibrous filler. Other fibrous materials may be employed such as mineral wool, glass wool, or cellulose. Preferaby the normal magnesium carbonate crystals are disintegrated prior to mixing them with fibrous fillers. The normal magnesium carbonate can be disintegrated, if desired, in the presence of finely-divided fillers such as the calcium carbonate mentioned above or other materials such as clays, diatomaceous earth, exfoliated mica and the like, any or all of which may be included in the formed product. Usually in products of this sort the normal magnesium carbonate constitutes a major proportion of the solids in material being formed.

From the foregoing, it is apparent that the method of producing articles by heating formed articles containing normal magnesium carbonate to convert the normal carbonate to basic magnesium carbonate is improved by the disintegration step herein described and that the new method permits the production of an improved product. Moreover, the disintegrated normal magnesium carbonate differs from the normal magnesium carbonate heretofore produced and is essentially a new product both in its physical characteristics and in its properties. Formed articles comprising particles of basic magnesium carbonate bonded together as a result of heating in situ disintegrated normal magnesium carbonate crystals to convert them into basic carbonate are likewise new. The degree of desired disintegration is readily determined by experiment and said degree of disintegration may be easily checked by measurement of the crystal sizes by use of a microscope.

While this invention has been described in connection with certain specific illustrations of the practice thereof, it is to be understood that this has been done merely for the purpose of exemplification and that the scope of this invention is to be governed by the language of the following claims.

We claim:

1. A formed article comprising a minor proportion of fiber and in major proportion a multiplicity of basic magnesium carbonate particles bonded together by formation in situ in said article by decomposition of irregularly-shaped normal magnesium carbonate particles the average particle size of which, taking the maximum dimension of the individual particles as the basis of measurement, is less than 10 microns.

2. A formed article comprising a minor proportion of fiber and a major proportion of basic magnesium carbonate particles bonded together by formation in situ in said article by decomposition of normal magnesium carbonate particles substantially all of which are less than 20 microns in maximum dimension.

3. A method of manufacturing a formed article comprising basic magnesium carbonate, which comprises disintegrating needle-shaped normal magnesium carbonate crystals by mechanically grinding said crystals in the presence of water to form a multiplicity of disintegrated normal magnesium carbonate crystals averaging less than 10 microns in size (taking the maximum dimension of the individual particles as the basis of measurement), making a formed mass containing the disintegrated crystals of normal magnesium carbonate, a filler comprising fiber and water, and heating the formed mass while moist to convert said disintegrated normal magnesium carbonate crystals to basic magnesium carbonate.

4. A method of manufacturing a formed article comprising basic magnesium carbonate, which comprises mechanically disintegrating, in the presence of water, needle-shaped crystals of normal magnesium carbonate to form therefrom a multiplicity of particles of unordered shape, the average length of the crystals being less than 10 microns, making a formed mass containing said disintegrated normal magnesium carbonate crystals and water, and heating the formed mass to convert said disintegrated normal magnesium carbonate crystals to basic magnesium carbonate.

5. A method of making a molded heat insulation material comprising basic magnesium carbonate, which comprises disintegrating by mechanical grinding needle-shaped crystals of normal magnesium carbonate to form therefrom a multiplicity of particles of unordered shape substantially all of which have a maximum dimension not greater than about 20 microns, making a formed mass containing said disintegrated normal magnesium carbonate crystals and water, and heating the formed mass while moist to convert said disintegrated normal magnesium carbonate crystals to basic magnesium carbonate.

6. A method of manufacturing a structural material, which comprises disintegrating by mechanical grinding, in the presence of water, needle-shaped crystals of normal magnesium carbonate to form therefrom a multiplicity of irregularly-shaped particles substantially all of which have a maximum dimension not greater than about 20 microns, making an aqueous furnish containing said disintegrated normal magnesium carbonate and fiber, water laying said fibrous furnish to produce a formed mass comprising said disintegrated normal magnesium carbonate crystals, and heating the formed mass while moist to convert said disintegrated normal magnesium carbonate crystals to basic magnesium carbonate.

HAROLD W. GREIDER.
ROGER A. MacARTHUR.